US011700950B2

(12) United States Patent
Choi

(10) Patent No.: US 11,700,950 B2
(45) Date of Patent: Jul. 18, 2023

(54) ADJUSTABLE SUPPORT AND BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 433 days.

(21) Appl. No.: 16/858,940

(22) Filed: Apr. 27, 2020

(65) Prior Publication Data

US 2020/0337468 A1 Oct. 29, 2020

(30) Foreign Application Priority Data

Apr. 28, 2019 (CN) .......................... 201920599975.9

(51) Int. Cl.
*A47C 19/12* (2006.01)
*F16B 7/10* (2006.01)

(52) U.S. Cl.
CPC ............ *A47C 19/128* (2013.01); *F16B 7/105* (2013.01)

(58) Field of Classification Search
CPC ...... A47C 19/021; A47C 19/024; A47C 19/04; A47C 19/12; A47C 19/0128; F16B 12/44; F16B 7/10; F16B 7/105; F16M 2200/02; E04H 15/46; E04H 15/60; E05C 1/00; E05C 1/002; E05C 1/004; E05C 1/04
See application file for complete search history.

(56) References Cited

U.S. PATENT DOCUMENTS

| 190,338 | A | 5/1877 | Hall |
| 202,685 | A | 4/1878 | White |
| 261,770 | A | 7/1882 | Segar |
| 324,843 | A | 8/1885 | Horton |
| 337,415 | A | 3/1886 | McKeough |
| 478,761 | A | 7/1892 | Rodecap |
| 605,126 | A | 6/1898 | Odell |
| 767,680 | A | 8/1904 | Barton |
| 802,390 | A | 10/1905 | Gusdorf |
| 893,364 | A | 7/1908 | Piaser |
| 1,070,525 | A | 8/1913 | Pieper |
| 1,196,253 | A | 8/1916 | Lowy |
| 1,218,868 | A | 3/1917 | Jones |
| 1,259,825 | A | 3/1918 | Basile |
| 1,360,983 | A | 11/1920 | Burton |
| 1,367,173 | A | 2/1921 | Felix |
| 1,530,726 | A | 3/1925 | Koenigkramer |
| 1,574,659 | A | 2/1926 | Johnston |
| 1,599,971 | A | 9/1926 | Melson |
| 2,380,632 | A * | 7/1945 | Cousino ................ F16B 7/105 248/188.4 |

(Continued)

FOREIGN PATENT DOCUMENTS

| CN | 204336376 U | 5/2015 |
| CN | 204336377 U | 5/2015 |
| GB | 810195 A | 3/1959 |

*Primary Examiner* — David R Hare
(74) *Attorney, Agent, or Firm* — Morgan, Lewis & Bockius LLP

(57) ABSTRACT

Disclosed are adjustable supports and frames. An adjustable support includes an inner bar, an outer bar and a locking/unlocking mechanism for controlling the relative movement of the inner and outer bars. The locking/unlocking mechanism includes a casing pivotally connected with the outer bar, a pin coupled with the casing, and an elastic member to engage the pin with the inner and outer bars.

19 Claims, 5 Drawing Sheets

(56) References Cited

U.S. PATENT DOCUMENTS

| | | | | |
|---|---|---|---|---|
| 2,513,168 | A | 6/1950 | Gottlieb | |
| 2,651,787 | A | 9/1953 | Piliero | |
| 2,671,229 | A | 3/1954 | Vernier | |
| 2,678,085 | A | 5/1954 | De Minno | |
| 2,701,603 | A | 2/1955 | Coopersmith | |
| 2,782,075 | A | 2/1957 | Fagan | |
| 2,888,688 | A | 6/1959 | Bereman | |
| 3,108,291 | A | 10/1963 | Eason | |
| 3,188,138 | A | 6/1965 | Lockshin | |
| 3,245,363 | A | 4/1966 | Kanitz | |
| 3,295,149 | A | 1/1967 | Hall | |
| 3,967,330 | A | 7/1976 | Zawadowsky | |
| 4,048,683 | A | 9/1977 | Chen | |
| 4,594,743 | A | 6/1986 | Owen | |
| 4,620,336 | A | 11/1986 | Miller | |
| 4,654,905 | A | 4/1987 | Miller | |
| 4,773,108 | A | 9/1988 | Leever | |
| 5,331,725 | A | 7/1994 | Chou | |
| 5,517,744 | A | 5/1996 | Moser | |
| 5,608,930 | A | 3/1997 | Chen | |
| 5,894,614 | A | 4/1999 | Stroud | |
| 6,062,589 | A | 5/2000 | Cheng | |
| 6,151,730 | A | 11/2000 | Weston | |
| 6,223,628 | B1 | 5/2001 | Barron | |
| 6,230,344 | B1 | 5/2001 | Thompson | |
| 6,299,113 | B1 * | 10/2001 | Yamashita | A47C 3/40 248/161 |
| 6,336,680 | B1 * | 1/2002 | Lee | A47C 1/03 297/411.36 |
| 6,575,656 | B2 * | 6/2003 | Suh | E04H 15/46 403/379.5 |
| 6,643,900 | B2 | 11/2003 | Jahrling | |
| 6,938,927 | B1 * | 9/2005 | Martin | A63C 11/221 135/69 |
| 7,066,676 | B2 * | 6/2006 | Tsai | F16B 7/042 403/379.2 |
| 7,144,078 | B2 | 12/2006 | Hsieh | |
| 7,290,742 | B2 * | 11/2007 | Wang | F16M 13/027 410/151 |
| 7,376,989 | B2 | 5/2008 | Wickstrom | |
| 7,406,727 | B2 | 8/2008 | Wickstrom | |
| 7,503,086 | B2 | 3/2009 | Wickstrom | |
| 7,849,867 | B2 * | 12/2010 | Takayama | E04H 15/60 135/114 |
| 7,874,303 | B2 * | 1/2011 | Xie | E04H 15/46 135/120.3 |
| 8,312,576 | B1 | 11/2012 | Oh | |
| 8,370,973 | B1 | 2/2013 | Oh | |
| 8,490,930 | B2 * | 7/2013 | Huang | B60P 7/15 410/151 |
| 8,707,478 | B2 | 4/2014 | Jin | |
| 8,769,740 | B2 | 7/2014 | Oh | |
| 8,806,677 | B1 | 8/2014 | Bartelsmeyer | |
| 8,856,984 | B1 | 10/2014 | Donham | |
| 8,888,123 | B1 | 11/2014 | Cheng | |
| 8,898,832 | B2 | 12/2014 | Oh | |
| 8,978,176 | B1 | 3/2015 | Oh | |
| 9,027,181 | B1 | 5/2015 | Yu | |
| 9,027,952 | B2 | 5/2015 | Zhu | |
| 9,107,509 | B2 | 8/2015 | Lee | |
| 9,226,590 | B1 | 1/2016 | Hull et al. | |
| 9,248,072 | B2 * | 2/2016 | Wu | F16B 7/14 |
| 9,254,046 | B1 | 2/2016 | Arenstein | |
| 9,314,386 | B1 | 4/2016 | Boyd | |
| 9,456,698 | B2 | 10/2016 | Oh | |
| 9,456,699 | B1 | 10/2016 | Oh | |
| 9,526,347 | B2 | 12/2016 | Boyd | |
| 9,538,850 | B2 | 1/2017 | Oh | |
| 9,895,003 | B2 * | 2/2018 | Choi | A47C 19/04 |
| 9,907,405 | B2 | 3/2018 | An | |
| 10,021,986 | B1 | 7/2018 | Lin | |
| 10,034,551 | B2 | 7/2018 | Hull | |
| 10,123,629 | B2 | 11/2018 | Choi | |
| 10,125,801 | B2 | 11/2018 | Wilson | |
| 10,285,506 | B2 | 5/2019 | Choi | |
| 10,321,767 | B2 | 6/2019 | Jin | |
| 10,371,187 | B2 * | 8/2019 | Hansen | A47B 9/06 |
| 10,561,251 | B2 * | 2/2020 | Choi | A47C 19/22 |
| 10,890,201 | B2 * | 1/2021 | Tsai | F16B 7/105 |
| 11,103,077 | B2 * | 8/2021 | Choi | A47C 19/024 |
| 2003/0009848 | A1 | 1/2003 | Kuo | |
| 2003/0039506 | A1 | 2/2003 | Chen | |
| 2005/0016806 | A1 * | 1/2005 | Klinke | A47B 9/20 188/371 |
| 2005/0251911 | A1 | 11/2005 | Wickstrom | |
| 2006/0062632 | A1 * | 3/2006 | Jang | F16B 7/105 403/378 |
| 2006/0195982 | A1 | 9/2006 | Cloer | |
| 2006/0230532 | A1 | 10/2006 | Wickstrom | |
| 2007/0012346 | A1 * | 1/2007 | Choi | F16B 7/105 135/120.3 |
| 2008/0000024 | A1 | 1/2008 | Peixin | |
| 2009/0133191 | A1 | 5/2009 | Harrow | |
| 2009/0293193 | A1 | 12/2009 | Neatherry | |
| 2010/0115696 | A1 | 5/2010 | Felix, Jr. et al. | |
| 2010/0176634 | A1 | 7/2010 | Wahl | |
| 2010/0235989 | A1 | 9/2010 | Jin | |
| 2010/0299831 | A1 | 12/2010 | Lee | |
| 2011/0073723 | A1 | 3/2011 | Ashpole | |
| 2011/0099712 | A1 | 5/2011 | Jin | |
| 2012/0042449 | A1 | 2/2012 | Hull | |
| 2012/0222216 | A1 | 9/2012 | Jin | |
| 2012/0246826 | A1 | 10/2012 | Jin | |
| 2013/0067659 | A1 | 3/2013 | Oh | |
| 2013/0067862 | A1 | 3/2013 | Oh | |
| 2013/0276228 | A1 | 10/2013 | Hsieh | |
| 2013/0276229 | A1 | 10/2013 | Hsieh | |
| 2014/0030012 | A1 * | 1/2014 | Lee | F16B 7/105 403/326 |
| 2014/0345044 | A1 | 11/2014 | Murphy | |
| 2015/0130250 | A1 | 5/2015 | Masunaga | |
| 2015/0143630 | A1 | 5/2015 | Harrow | |
| 2015/0320225 | A1 | 11/2015 | Boyd | |
| 2015/0327684 | A1 | 11/2015 | Lee | |
| 2016/0143447 | A1 | 5/2016 | Hull | |
| 2016/0157620 | A1 | 6/2016 | Oh | |
| 2016/0206112 | A1 | 7/2016 | Oh | |
| 2016/0262547 | A1 | 9/2016 | Jin | |
| 2016/0281770 | A1 | 9/2016 | Vankoughnett | |
| 2016/0302582 | A1 | 10/2016 | Oh | |
| 2016/0302583 | A1 | 10/2016 | Oh | |
| 2016/0316922 | A1 | 11/2016 | Choi | |
| 2017/0119166 | A1 | 5/2017 | An | |
| 2017/0122353 | A1 | 5/2017 | Hallliburton | |
| 2017/0325592 | A1 | 11/2017 | Suh | |
| 2018/0110339 | A1 | 4/2018 | Moon | |
| 2018/0116412 | A1 | 5/2018 | Jin | |
| 2018/0192778 | A1 | 7/2018 | Choi | |
| 2018/0271296 | A1 | 9/2018 | Harrow | |
| 2018/0332973 | A1 | 11/2018 | Choi | |
| 2019/0029435 | A1 * | 1/2019 | Choi | A47C 19/128 |
| 2019/0045938 | A1 | 2/2019 | Skaggs | |

* cited by examiner

ADJUSTABLE SUPPORT AND BED FRAME HAVING SAME

CROSS-REFERENCE TO RELATED APPLICATIONS

The present application claims priority to Chinese Utility Model Application CN 201920599975.9 filed Apr. 28, 2019. The disclosure of the application is incorporated herein for all purposes by reference in its entirety.

FIELD OF THE INVENTION

The present invention generally relates to supports and frames having such supports. More particularly, the present invention relates to adjustable supports and bed frames having such adjustable supports.

BACKGROUND

Folding beds are popular because they are easy to carry and can be folded to save space. A folding bed generally includes a frame top and a leg assembly coupled to the frame top. In order to have the leg assembly fold and unfold properly, many existing folding beds employ complicated mechanisms. In addition, supports of some existing folding beds are generally coupled to the lateral bars and frame tops without releasing or unlocking mechanisms.

Given the current state of the art, there remains a need for supports and foldable bed frames that address the above-mentioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides adjustable supports and frames that are stable and safe to use.

In various embodiments, the present invention provides an adjustable support including an outer tubular bar, an inner bar, and a locking/unlocking mechanism. The outer tubular bar includes a first restriction slot formed on a wall of the outer tubular bar at a first side of the tubular bar. The inner bar is disposed at least partially inside the outer tubular bar and selectively movable along a length direction of the outer tubular bar. The inner bar includes a second restriction slot formed at a first side of the inner bar corresponding to the first restriction slot of the outer tubular bar. The locking/unlocking mechanism is disposed outside of the outer tubular bar, and configured to control movement of the inner bar with respect to the outer tubular bar. The locking/unlocking mechanism includes a casing, a locking pin and an elastic member. The casing includes a first portion, a second portion and an intermediate portion between the first and second portions, wherein the intermediate portion is pivotally connected with the outer tubular bar. The locking pin is integrally formed or coupled with the first portion of the casing and disposed at a position corresponding to the first restriction of the outer tubular bar. The elastic member is coupled with the second portion of the casing, and has a first end abutting the second portion of the casing and a second end abutting the side wall of the outer tubular bar. When the second restriction slot of the inner bar aligns with the first restriction slot of the outer tubular bar, the elastic member pushes at least a portion of the locking pin into the second restriction slot of the inner bar, thereby restricting the inner bar from moving along the length direction of the outer tubular bar.

In some exemplary embodiments, pressing the second portion of the casing toward the outer tubular bar pulls the locking pin out of the second restriction slot of the inner bar, thereby unlocking the inner bar and allowing the inner bar to move along the length direction of the outer tubular bar.

In some exemplary embodiments, the inner bar includes a third restriction slot formed at the first side of the inner bar and spaced apart from the second restriction slot along a length direction of the inner bar. When the third restriction slot of the inner bar aligns with the first restriction slot of the outer tubular bar, the elastic member pushes at least a portion of the locking pin into the third restriction slot of the inner bar, thereby restricting the inner bar from moving along the length direction of the outer tubular bar.

In an exemplary embodiment, the third restriction slot of the inner bar includes a sloped edge to facilitate inserting and releasing the locking pin.

In some exemplary embodiments, the adjustable support further includes a clip having a mounting pin at each of first and second free end portions thereof. The intermediate portion of the casing includes a first installation hole at each of first and second sides of the casing. The outer tubular bar includes a second installation hole at each of second and third sides of the outer tubular bar. The mounting pin has a first portion received in the first installation hole of the casing and a second portion received in the second installation of the outer tubular bar, thereby pivotally coupling the casing with the outer tubular bar In an exemplary embodiment, the clip is disposed at an opposite side of the outer tubular bar with respect to the casing.

In some exemplary embodiments, the first portion of the casing includes a pin hole at each of first and second sides of the casing. The locking pin has a first end portion received in the pin hole at the first side of the casing, a second end portion received in the pin hole at the second side of the casing, and an intermediate portion between the first and second end portions that is received in the first restriction slot of the outer tubular bar.

In some exemplary embodiments, the second portion of the casing includes a cavity, and a pillar extended from a bottom wall of the cavity toward the outer tubular bar, wherein at least a portion of the elastic member is received in the cavity and engaged with the pillar.

In some exemplary embodiments, the second portion of the casing includes a plateau facing away from the outer tubular bar and configured to facilitate pressing the second portion of the casing toward the outer tubular bar.

In some exemplary embodiments, the adjustable support further includes an end fitting. The end fitting includes an opening to accommodate crosswise the inner bar, and one or more snap joints to couple with the outer tubular bar, with a substantial portion of the end fitting disposed inside of the outer tubular bar. Each snap joint in the one or more snap joints includes an elastic piece and a protrusion protruded outwardly from the elastic piece, and the outer tubular bar includes one or more fitting holes adjacent a proximal end of the outer tubular bar. The protrusion of each respective snap joint in the one or more joints is disposed in a corresponding fitting hole in the one or more fitting holes of the outer tubular bar, thereby coupling the end fitting with the outer tubular bar.

In an exemplary embodiment, the outer tubular bar has a substantially oblong cross section and the inner bar is a solid flat piece.

In some exemplary embodiments, the inner bar is solid or tubular.

In various embodiments, the present invention provides a frame including a frame top, a leg assembly pivotally connected to the frame top, and one or more adjustable supports disclosed herein. Each adjustable support in the one or more adjustable supports has one end connected to the frame top and the other end connected to the leg assembly. When locked, the one or more adjustable supports restrict the leg assembly from rotating toward or away from the frame top, and when unlocked, the one or more adjustable supports allow the leg assembly to fold or unfold with respect to the frame top, In some exemplary embodiments, when at least a portion of the locking pin resides in the second restriction slot of the inner bar, the leg assembly is locked in an unfolded state.

In some exemplary embodiments, when at least a portion of the locking pin resides in the third restriction slot of the inner bar, the leg assembly is locked in a folded state.

The adjustable supports and frames of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more embodiments of the present invention and, together with the Detailed Description, serve to explain the principles and implementations of exemplary embodiments of the invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Exemplary embodiments of the present invention are described in the context of supports and frames such as bed frames, table frames, or the like. The frames can be of various sizes and of various shapes, can be made of various materials, and can be foldable. For instance, bed frames are of various sizes including, but not limited to, twin, full, queen and king sizes, and of various shapes including but not limited to rectangles and squares. In addition, bed frames can be made of various materials including, but not limited to, metals such as steel, plastics and woods.

Figure 1:
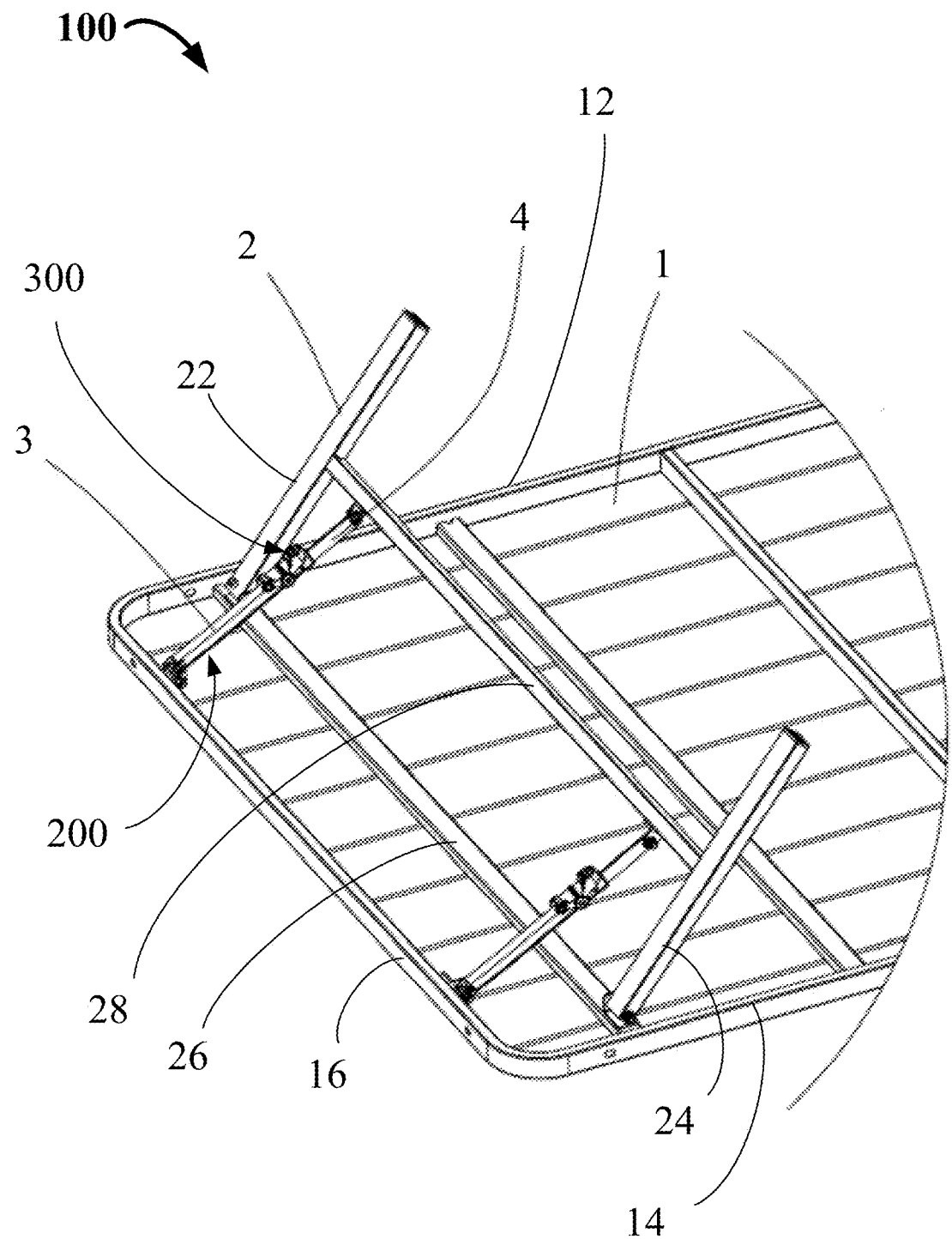
FIG. 1 is a perspective view illustrating a frame in accordance with exemplary embodiments of the present invention.

Referring to FIG. 1, there is depicted an exemplary frame in accordance with some exemplary embodiments of the present disclosure. As shown, exemplary frame 100 in general includes a frame top such as frame top 1, a leg assembly such as leg assembly 2, and one or more adjustable supports such as adjustable support 200. It should be noted that frame top 1 in FIG. 1 is truncated. It should also be noted that frame top 1 itself can be foldable or non-foldable. For instance, in an exemplary embodiment, frame top 1 includes first and second sub-frames pivotally connected with each other at their adjacent sides and foldable onto each other. In another exemplary embodiment, frame top 1 is a single piece. In some exemplary embodiments, frame 100 is a bed frame.

Leg assembly 2 is pivotally connected with frame top 1. For instance, in some exemplary embodiments, frame top 1 includes first frame longitudinal bar 12, second frame longitudinal bar 14, and first frame lateral bar 16 formed or coupled with the first and second longitudinal bars. Leg assembly 2 includes first leg lateral bar 26 having a first end pivotally connected with the first frame longitudinal bar and a second end pivotally connected with the second frame longitudinal bar. Leg assembly 2 also includes first leg 22 and second leg 24 spaced apart in the lateral direction of the frame top. Each of the first and second legs has a first end connected with the first leg lateral bar. In an exemplary embodiment, leg assembly 2 further includes second leg lateral bar 28 spaced apart from the first leg lateral bar in a length direction of the first or second leg. The second leg lateral bar has a first end connected with the first leg and a second end connected with the second leg.

Adjustable support 200 is configured to help support and stabilize the frame top when the frame is in use. For instance, in some exemplary embodiments, adjustable support 200 has one end connected to the frame top such as frame lateral bar 16 and the other end connected to the leg assembly such as second leg lateral bar 28. As such, when locked, the one or more adjustable supports restrict the leg assembly from rotating toward or away from the frame top. When unlocked, the one or more adjustable supports allow the leg assembly to fold or unfold with respect to the frame top. It should be noted that for one leg assembly, the frame can include one, two, three, or more than three adjustable supports. By way of example, FIG. 1 illustrates two adjustable supports 200 that connect one leg assembly 2 with frame top 1 and help support the frame top when in use.

Referring to FIGS. 2-5, in some exemplary embodiments, adjustable support 200 includes an outer bar such as outer bar 3, an inner bar such as inner bar 4, and a locking/unlocking mechanism such as locking/unlocking mechanism 300. In some exemplary embodiments, the outer bar is a tubular bar; and the outer bar and the inner bar are movably coupled to each other, with at least a portion of the inner bar being inserted in the outer tubular bar. As used herein, the term "tubular bar" refers to an elongated bar that is hollow along a portion or an entire length of the bar. The cross section of a tubular bar can be of any suitable shape, e.g., regular or irregular, including, but not limited to, circular, polygonal and oval and oblong. In an exemplary embodiment, the inner bar is a solid flat piece. In another exemplary embodiment, the inner bar is a tubular bar.

In some exemplary embodiments, the outer tubular bar includes a restriction slot such as first restriction slot 32. The first restriction slot is formed on a wall of the outer tubular bar at a first side of the tubular bar. In an embodiment, the first restriction slot of the outer tubular bar is formed at a position adjacent an end of the outer tubular bar (e.g., adjacent the upper end of the outer tubular bar in FIG. 3).

Figure 4:
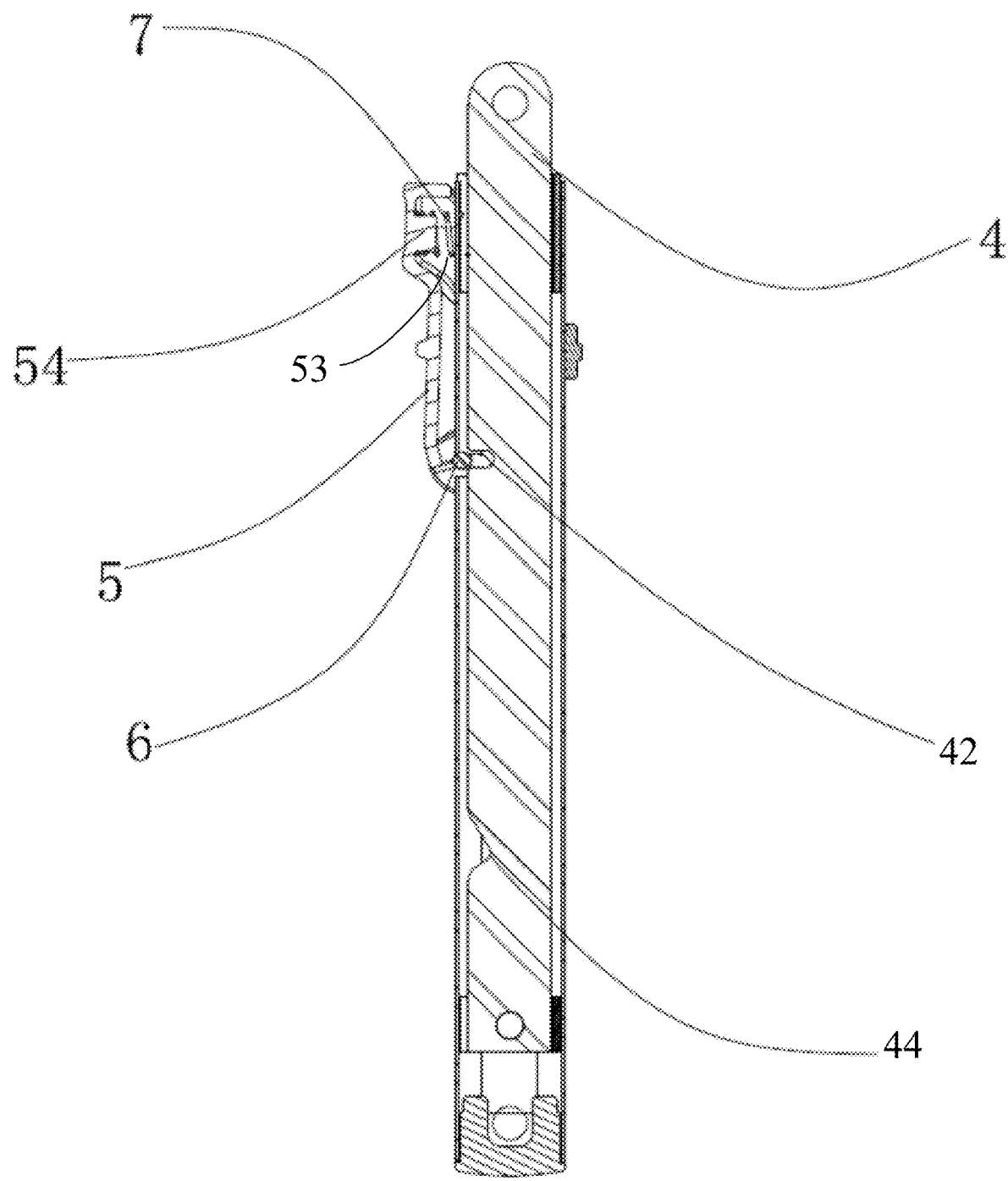
FIG. 4 is a cross-sectional view illustrating an adjustable support at a first state in accordance with exemplary embodiments of the present invention.
Figure 5:
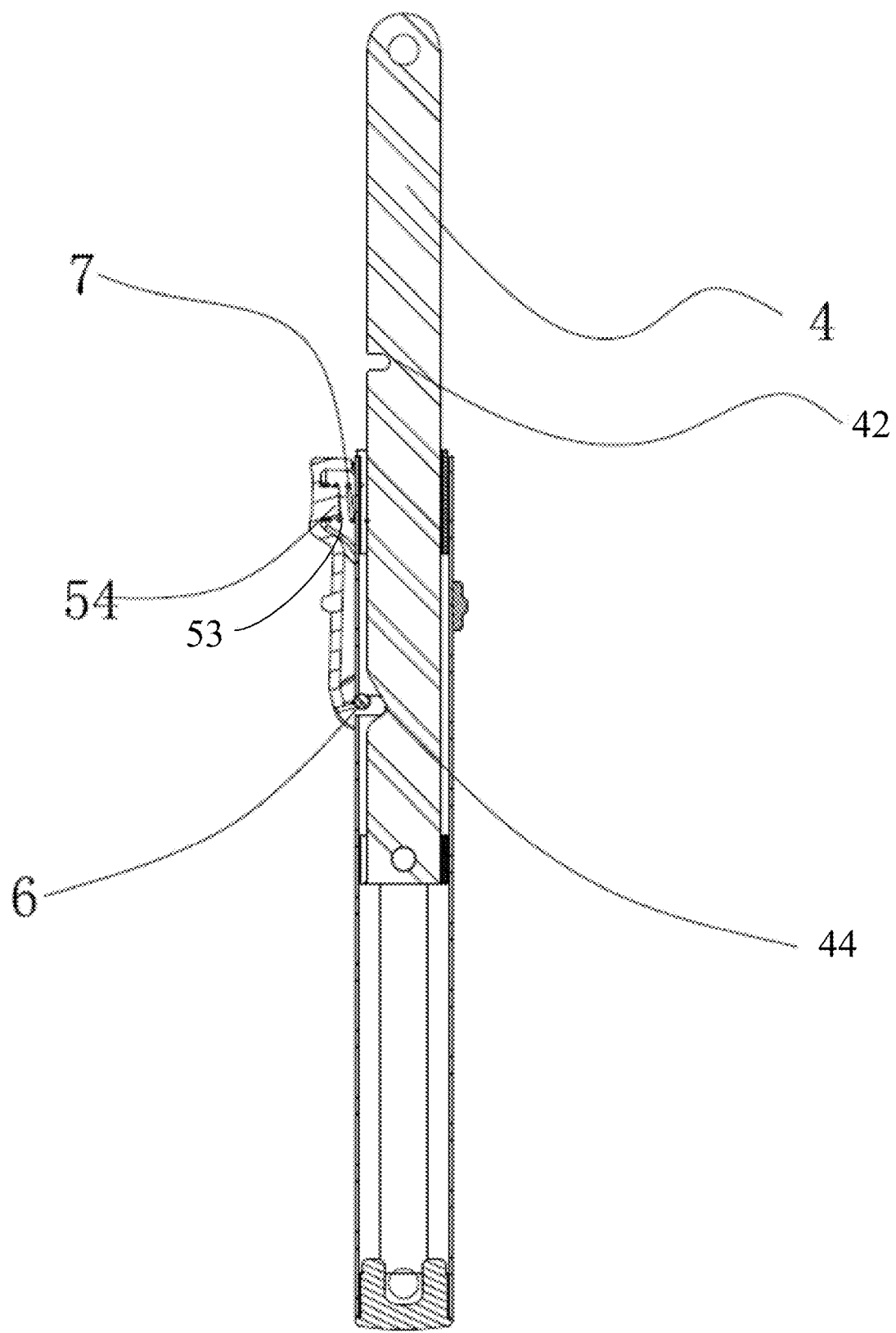
FIG. 5 is a cross-sectional view illustrating an adjustable support in a second state in accordance with exemplary embodiments of the present invention.

The inner bar includes at least one restriction slot formed at a side of the inner bar. For instance, in an exemplary embodiment, the inner bar includes second restriction slot 42 formed at the first side of the inner bar. The second restriction slot of the inner bar and the first restriction slot of the outer tubular bar correspond to each other (e.g., they can be aligned to each other as illustrated in FIG. 4). In another exemplary embodiment, the inner bar includes one or more additional restriction slot formed at the first side of the inner bar, i.e., formed on the same side of the inner bar as that of the second restriction slot. For instance, in an exemplary embodiment, the inner bar includes third restriction slot 44 formed at the first side of the inner bar and spaced away from the second restriction slot in a length direction of the inner bar. Like the second restriction slot, the third restriction slot of the inner bar and the first restriction slot of the outer tubular bar correspond to each other (e.g., they can be aligned to each other as illustrated in FIG. 5).

In various exemplary embodiments, locking/unlocking mechanism 300 is disposed outside of the outer tubular bar, and is configured to control movement of the inner bar with respect to the outer tubular bar. In some exemplary embodiments, locking/unlocking mechanism 300 includes a casing pivotally connected with the outer tubular bar, a pin coupled to the casing, and an elastic member for engaging the pin with the inner bar and the outer tubular bar. For instance, in some exemplary embodiments, locking/unlocking mechanism 300 includes casing 5, locking pin 6 and elastic member 7 (e.g., spring).

Figure 2:
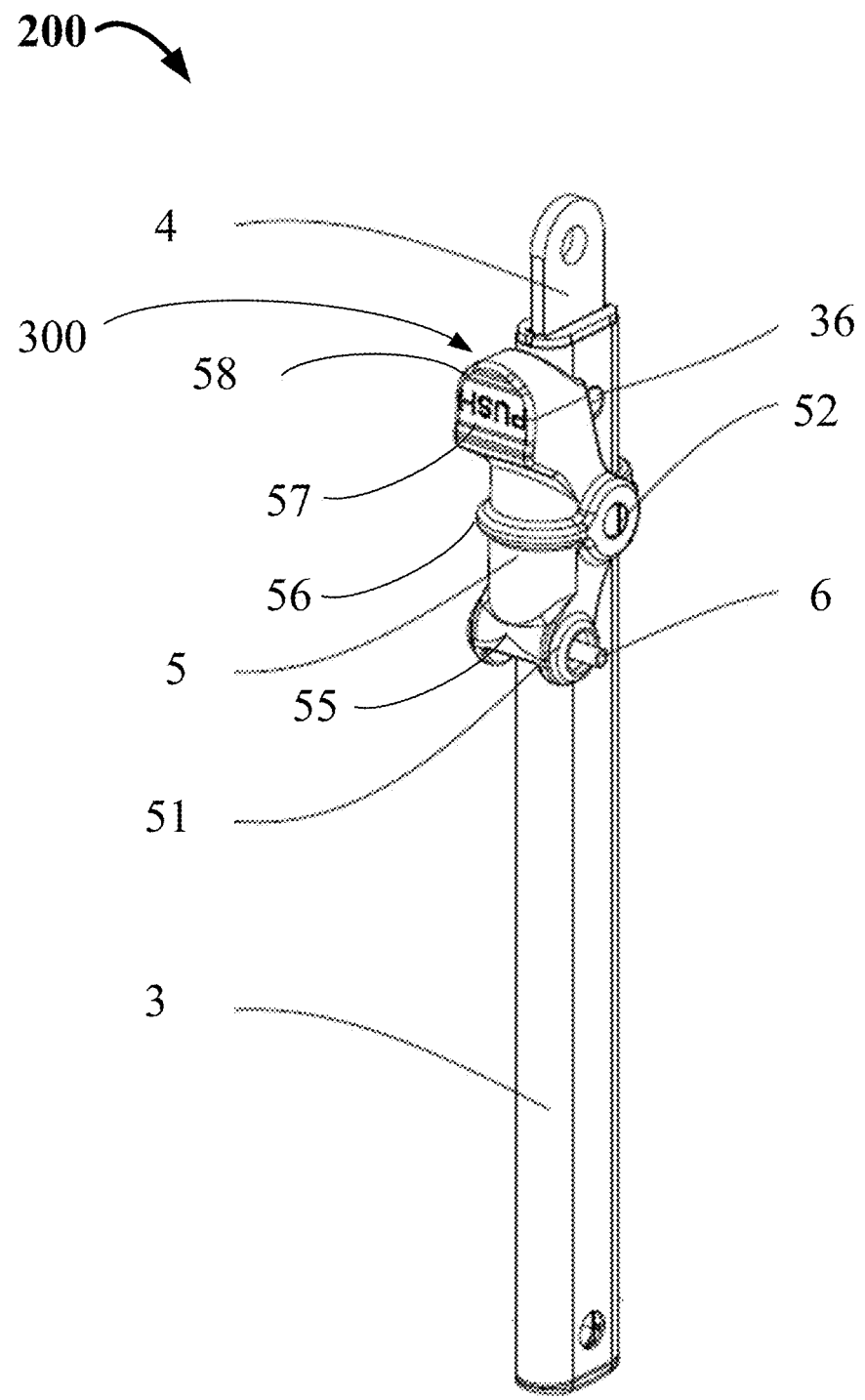
FIG. 2 is a perspective view illustrating an adjustable support in accordance with exemplary embodiments of the present invention.
Figure 3:
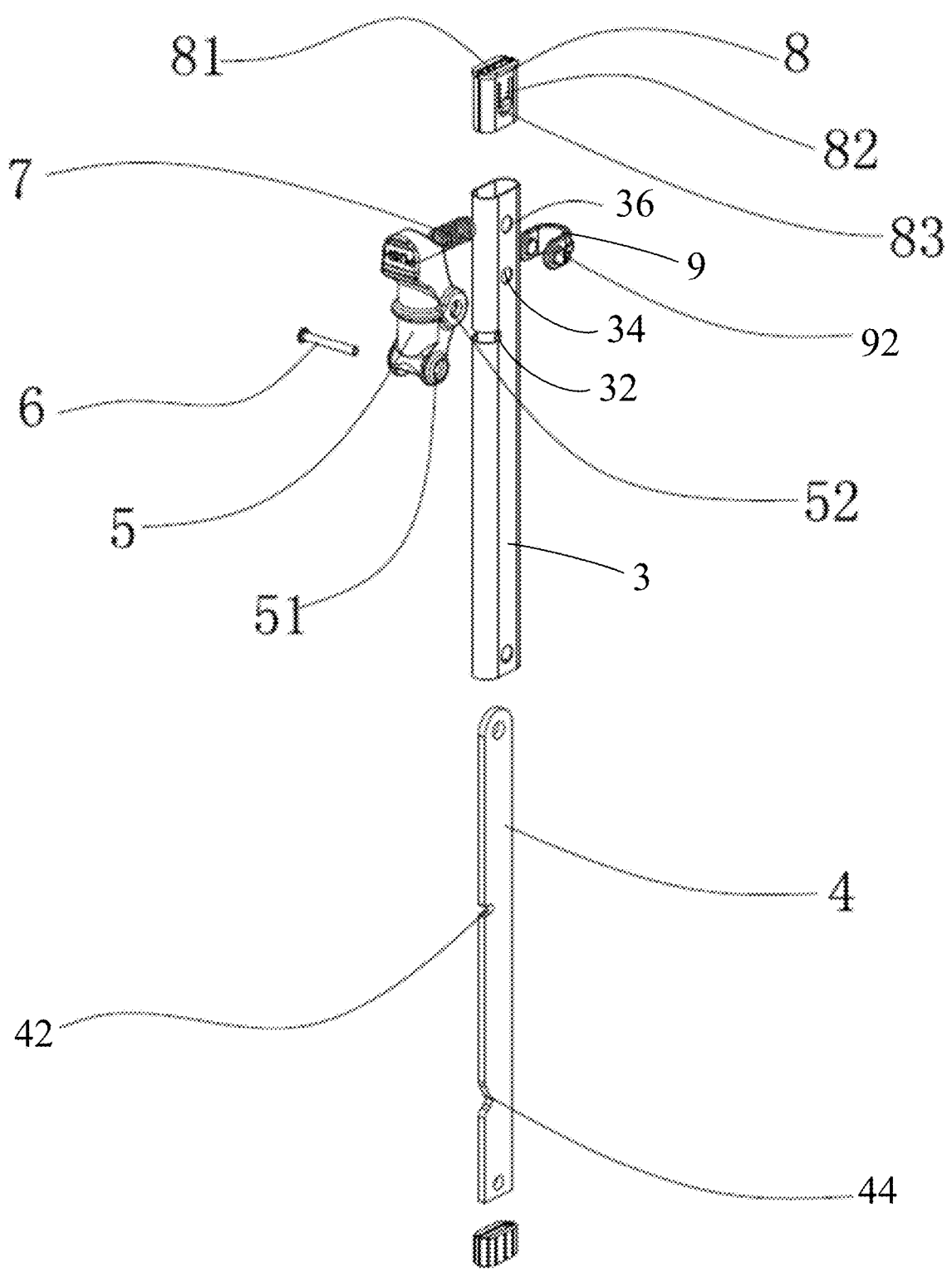
FIG. 3 is a perspective view illustrating a disassembled adjustable support in accordance with exemplary embodiments of the present invention.

Casing 5 includes first portion 55, second portion 57 and intermediate portion 56. In some exemplary embodiments, casing 5 is a unitary casing with the first, second and intermediate portions being integrally formed as one piece. The intermediate portion is disposed between the first and second portions, and pivotally connected with the outer tubular bar, for instance, by a coupler such as clip 9. In some exemplary embodiments, the intermediate portion of the casing includes first installation hole 52 at each of two sides of the casing. In an exemplary embodiment, the intermediate portion of the casing includes one or more strengthening members to increase the strength of the first installation hole and/or the casing. For instance, by way of example, FIGS. 2 and 3 illustrate a circular or cylindrical structure surrounding the first installation hole, and a semicircular structure on the casing between the first installation holes. The outer tubular bar includes second installation hole 34 at each of two corresponding sides of the outer tubular bar. Clip 9 includes mounting pin 92 at each of its two free end portions. Mounting pin 92 has a first portion received in the first installation hole of the casing and a second portion received in the second installation of the outer tubular bar, thereby pivotally coupling the casing with the outer tubular bar. In an exemplary embodiment, the casing and clip are disposed at opposite sides of the outer tubular bar.

Pin 6 is integrally formed or coupled with the first portion of the casing. For instance, in some exemplary embodiments, the first portion of the casing includes a pin hole such as pin hole 51 at each of first and second sides of the casing. In an exemplary embodiment, the first portion of the casing includes one or more strengthening members such as a circular or cylindrical structure surrounding the pin hole to increase the strength of the pine hole and/or the casing. The locking pin has a first end portion received in the pin hole at the first side of the casing and a second end portion received in the pin hole at the second side of the casing. The locking pin is disposed at a position corresponding to the first restriction of the outer tubular bar. For instance, in an exemplary embodiment, the locking pin is positioned such that an intermediate portion between the first and second end portions is received in the first restriction slot of the outer tubular bar.

Elastic member 7 is coupled with the second portion of the casing, and has a first end abutting the second portion of the casing and a second end abutting the side wall of the outer tubular bar. For instance, in some exemplary embodiments, the second portion of the casing includes a cavity such as cavity 53 to accommodate at least a portion of the elastic member. In some exemplary embodiments, the second portion of the casing further includes a pillar such as pillar 54 extended from a bottom wall of the cavity toward the outer tubular bar for engaging or holding the elastic member. When the second restriction slot of the inner bar aligns with the first restriction slot of the outer tubular bar, the elastic member pushes at least a portion of the locking pin into the second restriction slot of the inner bar, thereby restricting the inner bar from moving along the length direction of the outer tubular bar. Similarly, when the third restriction slot of the inner bar aligns with the first restriction slot of the outer tubular bar, the elastic member pushes at least a portion of the locking pin into the third restriction slot of the inner bar, thereby restricting the inner bar from moving along the length direction of the outer tubular bar.

In some exemplary embodiments, when at least a portion of the locking pin resides in the second restriction slot of the inner bar, the leg assembly is locked in an unfolded state (e.g., a leg of the assembly is substantially perpendicular to the frame top). When at least a portion of the locking pin resides in the third restriction slot of the inner bar, the leg assembly is locked in a folded state (e.g., a leg of the leg assembly is folded onto the frame top).

Pressing the second portion of the casing pulls the locking pin out of the second or third restriction slot of the inner bar. This disengages the inner bar from the outer tubular and thus allows the inner bar to move along the length direction of the outer bar (e.g., the adjustable bar is unlocked). In some exemplary embodiments, pressing the second portion of the casing also pulls the locking pin out of the first restriction slot of the outer tubular bar. In some exemplary embodiments, to facilitate pressing the second portion of the casing toward the outer tubular bar, the second portion of the casing includes a plateau such as plateau 58 at a side of the casing facing away from the outer tubular bar.

When the second portion of the casing is not pressed, the elastic member pushes at least a portion of the locking pin into the first restriction slot of the outer tubular bar, and into a restriction slot (e.g., the second or third restriction slot) of the inner bar if the restriction slot of the inner bar aligns with the first restriction slot of the outer tubular bar, thereby locking the adjustable support.

In some exemplary embodiments, a restriction slot (e.g., the third restriction slot as illustrated in FIG. 3) of the inner bar includes a sloped edge to facilitate insertion and releasing of the locking pin.

In some exemplary embodiments, the adjustable support of the present disclosure includes one or more additional, optional or alternative elements. For instances, in some exemplary embodiments, adjustable support 200 further includes an end fitting such as end fitting 8 to help stabilize the movement of the inner bar relative to the tubular outer bar. The end fittings, such as end fitting 8, includes an opening such as opening 81 to accommodate crosswise the inner bar. End fitting 8 also includes one or more snap joints to couple with the outer tubular bar, with a substantial portion of the end fitting disposed inside of the outer tubular bar. For instance, in some exemplary embodiments, the outer tubular bar includes one or more fitting holes such as fitting hole 36 adjacent a proximal end of the outer tubular bar. Corresponding to the one or more fitting holes, each snap joint in the one or more snap joints includes an elastic piece such as elastic piece 82 and a protrusion such as protrusion 83 protruded outwardly from the elastic piece. The protrusion of each respective snap joint in the one or more joints is disposed in a corresponding fitting hole in the one or more fitting holes of the outer tubular bar, thereby coupling the end fitting with the outer tubular bar. In an exemplary embodiment, elastic piece 82 is formed integrally with the main body of the end fitting with a cut or a gap between the elastic piece and the main body of the end fitting.

As disclosed herein, an adjustable support of the present disclosure includes an inner bar, an outer bar and a locking/unlocking mechanism. With these features, folding and unfolding the frame is simple and convenient. For example, to unfold the frame, rotate the leg assembly away from the frame top. As one end of the adjustable support is connected to the leg assembly and the other end of the adjustable support is connected to the frame top, rotating the leg assembly causes the movement of the inner and outer tubular bars with respect to each other. When the leg assembly is unfolded, the first and second restriction slots of the inner and outer bars are aligned with each other. Aided by the elastic member, at least a portion of the locking pin of the locking/unlocking mechanism is pushed into the first and second restriction holes of the inner and outer bars, thereby restricting the inner and outer bars from further movements. At this stage, the frame top, the leg assembly and the adjustable support(s) collectively form a triangular structure, making the unfolded frame firm and stable. To fold the leg assembly, push the second portion of the casing to pull the locking pin out of the restriction hole of the inner bar or from the restriction holes of both the inner and outer bars. This allows the inner and outer bars to move with respect to each other and thus allows the leg assembly to rotate toward and fold onto the frame top.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "inward" or "outward", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first restriction slot could be termed a second restriction slot, and, similarly, a second restriction slot could be termed a first restriction slot, without changing the meaning of the description, so long as all occurrences of the "first restriction slot" are renamed consistently and all occurrences of the "second restriction slot" are renamed consistently.

What is claimed is:

1. An adjustable support comprising:
   an outer tubular bar comprising a first restriction slot formed on a side wall of the outer tubular bar at a first side of the tubular bar;
   an inner bar disposed at least partially inside the outer tubular bar and selectively movable along a length direction of the outer tubular bar, the inner bar comprising a second restriction slot formed at a first side of the inner bar corresponding to the first restriction slot of the outer tubular bar; and
   a locking/unlocking mechanism disposed outside of the outer tubular bar, and configured to control movement of the inner bar with respect to the outer tubular bar, the locking/unlocking mechanism comprising:
      a casing comprising a first portion, a second portion and an intermediate portion between the first and second portions, wherein the intermediate portion is pivotally connected with the outer tubular bar such that the first and second portions of the casing are rotatable with respect to the outer tubular bar;
      a locking pin integrally formed or coupled with the first portion of the casing and disposed at a position corresponding to the first restriction slot of the outer tubular bar; and
      an elastic member coupled with the second portion of the casing, the elastic member having a first end abutting the second portion of the casing and a second end abutting the side wall of the outer tubular bar, wherein when the second restriction slot of the inner bar aligns with the first restriction slot of the outer tubular bar, the elastic member pushes at least a portion of the locking pin into the second restriction slot of the inner bar, thereby restricting the inner bar from moving along the length direction of the outer tubular bar.

2. The adjustable support of claim 1, wherein pressing the second portion of the casing toward the outer tubular bar pulls the locking pin out of the second restriction slot of the inner bar, thereby unlocking the inner bar and allowing the inner bar to move along the length direction of the outer tubular bar.

3. The adjustable support of claim 1, wherein the inner bar comprises a third restriction slot formed at the first side of the inner bar and spaced apart from the second restriction slot along a length direction of the inner bar, wherein when the third restriction slot of the inner bar aligns with the first restriction slot of the outer tubular bar, the elastic member pushes at least a portion of the locking pin into the third restriction slot of the inner bar, thereby restricting the inner bar from moving along the length direction of the outer tubular bar.

4. The adjustable support of claim 3, wherein the third restriction slot of the inner bar comprises a sloped edge to facilitate insertion and releasing of the locking pin.

5. The adjustable support of claim 1, wherein the second portion of the casing comprises a cavity, and a pillar extended from a bottom wall of the cavity toward the outer tubular bar, wherein at least a portion of the elastic member is received in the cavity and engaged with the pillar.

6. The adjustable support of claim 1, wherein the second portion of the casing comprises a plateau facing away from the outer tubular bar and configured to facilitate pressing the second portion of the casing toward the outer tubular bar.

7. The adjustable support of claim 1, further comprising:
an end fitting comprising:
an opening to accommodate crosswise the inner bar; and
one or more snap joints to couple with the outer tubular bar, with a substantial portion of the end fitting disposed inside of the outer tubular bar, wherein
each snap joint in the one or more snap joints comprises an elastic piece and a protrusion protruded outwardly from the elastic piece;
the outer tubular bar comprises one or more fitting holes adjacent an proximal end of the outer tubular bar; and
the protrusion of each respective snap joint in the one or more joints is disposed in a corresponding fitting hole in the one or more fitting holes of the outer tubular bar, thereby coupling the end fitting with the outer tubular bar.

8. The adjustable support of claim 1, wherein the outer tubular bar has a substantially oblong cross section and the inner bar is a solid flat piece.

9. The adjustable support of claim 1, wherein the inner bar is solid or tubular.

10. A frame comprising:
a frame top;
a leg assembly pivotally connected to the frame top; and
one or more adjustable supports of claim 1, wherein each of the one or more adjustable supports has one end connected to the frame top and the other end connected to the leg assembly, wherein when locked, the one or more adjustable supports restrict the leg assembly from rotating toward or away from the frame top, and when unlocked, the one or more adjustable supports allow the leg assembly to fold or unfold with respect to the frame top.

11. The frame of claim 10, wherein when the at least a portion of the locking pin resides in the second restriction slot of the inner bar, the leg assembly is locked in an unfolded state.

12. The frame of claim 10, wherein of each adjustable support in the one or more adjustable supports, the inner bar comprises a third restriction slot formed at the first side of the inner bar and spaced apart from the second restriction slot along a length direction of the inner bar, wherein when the third restriction slot of the inner bar aligns with the first restriction slot of the outer tubular bar, the elastic member pushes at least a portion of the locking pin into the third restriction slot of the inner bar, thereby restricting the inner bar from moving along the length direction of the outer tubular bar.

13. The frame of claim 12, wherein when the at least a portion of the locking pin resides in the third restriction slot of the inner bar, the leg assembly is locked in a folded state.

14. The frame of claim 1, wherein the casing is a unitary casing with the first, second and intermediate portions being integrally formed as one piece.

15. An adjustable support comprising:
an outer tubular bar comprising a first restriction slot formed on a side wall of the outer tubular bar at a first side of the tubular bar;
an inner bar disposed at least partially inside the outer tubular bar and selectively movable along a length direction of the outer tubular bar, the inner bar comprising a second restriction slot formed at a first side of the inner bar corresponding to the first restriction slot of the outer tubular bar;
a locking/unlocking mechanism disposed outside of the outer tubular bar, and configured to control movement of the inner bar with respect to the outer tubular bar, the locking/unlocking mechanism comprising:
a casing comprising a first portion, a second portion and an intermediate portion between the first and second portions, wherein the intermediate portion is pivotally connected with the outer tubular bar;
a locking pin integrally formed or coupled with the first portion of the casing and disposed at a position corresponding to the first restriction slot of the outer tubular bar; and
an elastic member coupled with the second portion of the casing, the elastic member having a first end abutting the second portion of the casing and a second end abutting the side wall of the outer tubular bar, wherein when the second restriction slot of the inner bar aligns with the first restriction slot of the outer tubular bar, the elastic member pushes at least a portion of the locking pin into the second restriction slot of the inner bar, thereby restricting the inner bar from moving along the length direction of the outer tubular bar; and
a clip comprising a mounting pin at each of first and second free end portions thereof, wherein
the intermediate portion of the casing comprises a first installation hole at each of first and second sides of the casing;
the outer tubular bar comprises a second installation hole at each of second and third sides of the outer tubular bar; and
the mounting pin has a first portion received in the first installation hole of the casing and a second portion received in the second installation of the outer tubular bar, thereby pivotally coupling the casing with the outer tubular bar.

16. The adjustable support of claim 15, wherein the clip is disposed at an opposite side of the outer tubular bar with respect to the casing.

17. A frame comprising:
a frame top;
a leg assembly pivotally connected to the frame top; and
one or more adjustable supports of claim 15, wherein each of the one or more adjustable supports has one end connected to the frame top and the other end connected to the leg assembly, wherein when locked, the one or more adjustable supports restrict the leg assembly from rotating toward or away from the frame top, and when unlocked, the one or more adjustable supports allow the leg assembly to fold or unfold with respect to the frame top.

18. An adjustable support comprising:
an outer tubular bar comprising a first restriction slot formed on a side wall of the outer tubular bar at a first side of the tubular bar;
an inner bar disposed at least partially inside the outer tubular bar and selectively movable along a length direction of the outer tubular bar, the inner bar comprising a second restriction slot formed at a first side of the inner bar corresponding to the first restriction slot of the outer tubular bar;
a locking/unlocking mechanism disposed outside of the outer tubular bar, and configured to control movement of the inner bar with respect to the outer tubular bar, the locking/unlocking mechanism comprising:
  a casing comprising a first portion, a second portion and an intermediate portion between the first and second portions, wherein the intermediate portion is pivotally connected with the outer tubular bar;
  a locking pin integrally formed or coupled with the first portion of the casing and disposed at a position corresponding to the first restriction slot of the outer tubular bar; and
  an elastic member coupled with the second portion of the casing, the elastic member having a first end abutting the second portion of the casing and a second end abutting the side wall of the outer tubular bar, wherein when the second restriction slot of the inner bar aligns with the first restriction slot of the outer tubular bar, the elastic member pushes at least a portion of the locking pin into the second restriction slot of the inner bar, thereby restricting the inner bar from moving along the length direction of the outer tubular bar; and
wherein the first portion of the casing comprises a pin hole at each of first and second sides of the casing, wherein the locking pin has a first end portion received in the pin hole at the first side of the casing, a second end portion received in the pin hole at the second side of the casing, and an intermediate portion between the first and second end portions that is received in the first restriction slot of the outer tubular bar.

19. A frame comprising:
a frame top;
a leg assembly pivotally connected to the frame top; and
one or more adjustable supports of claim 18, wherein each of the one or more adjustable supports has one end connected to the frame top and the other end connected to the leg assembly, wherein when locked, the one or more adjustable supports restrict the leg assembly from rotating toward or away from the frame top, and when unlocked, the one or more adjustable supports allow the leg assembly to fold or unfold with respect to the frame top.

* * * * *